(12) United States Patent
Fruchter et al.

(10) Patent No.: US 11,770,592 B2
(45) Date of Patent: Sep. 26, 2023

(54) INTRASEGMENT ADJUSTMENT OF VIDEO TRANSMISSION RATE

(71) Applicant: Synamedia Limited, Staines Upon Thames (GB)

(72) Inventors: Avi Fruchter, Neve Daniel (IL); Ilan Cohen, Herzliya (IL); Zorach Reuven Wachtfogel, Elazar (IL); Uziel Joseph Harband, Jerusalem (IL); Einav Rivni, Beit-Shemesh (IL); Thomas Paul Burnley, Hampshire (GB)

(73) Assignee: Synamedia Limited, Staines Upon (GB)

( * ) Notice: Subject to any disclaimer, the term of this patent is extended or adjusted under 35 U.S.C. 154(b) by 0 days.

(21) Appl. No.: 17/360,120

(22) Filed: Jun. 28, 2021

(65) Prior Publication Data
US 2022/0417614 A1    Dec. 29, 2022

(51) Int. Cl.
*H04N 21/647* (2011.01)
*H04N 7/12* (2006.01)
(Continued)

(52) U.S. Cl.
CPC ......... *H04N 21/64738* (2013.01); *H04N 7/12* (2013.01); *H04N 17/00* (2013.01);
(Continued)

(58) Field of Classification Search
CPC .... H04N 21/64738; H04N 7/12; H04N 17/00; H04N 21/64753; H04N 21/64792; H04N 21/8456
See application file for complete search history.

(56) References Cited

U.S. PATENT DOCUMENTS 9,332,046 B2 *  5/2016  Chan ................... H04L 65/4084
2014/0050082 A1  2/2014  Sun et al.
(Continued)

FOREIGN PATENT DOCUMENTS

EP    1947859 A1    7/2008

OTHER PUBLICATIONS

Extend European Search Report for corresponding European Appl. No. 22180280.4 dated Nov. 4, 2022.

*Primary Examiner* — Jefferey F Harold
*Assistant Examiner* — Franklin S Andramuno
(74) *Attorney, Agent, or Firm* — Fernando & Partners, LLP (57) ABSTRACT

A method includes determining a first transmission rate for transmitting an entirety of a segment of a video stream to a client device. The segment includes a set of frames. In some implementations, the method includes, after transmitting a first subset of the set of frames at the first transmission rate, detecting that a network connectivity of the client device has reduced below a connectivity threshold associated with the first transmission rate. In some implementations, the method includes transmitting an entirety of the segment at a second transmission rate that is less than the first transmission rate. In some implementations, the method includes triggering the client device to present a second subset of the set of frames that corresponds to a temporal position in the video stream after the first subset of the set of frames while foregoing re-presentation of the first subset of the set of frames.

20 Claims, 8 Drawing Sheets

(51) Int. Cl.
*H04N 21/845* (2011.01)
*H04N 17/00* (2006.01)
(52) U.S. Cl.
CPC . *H04N 21/64753* (2013.01); *H04N 21/64792* (2013.01); *H04N 21/8456* (2013.01)

(56) References Cited

U.S. PATENT DOCUMENTS

| | | |
|---|---|---|
| 2015/0113157 A1 | 4/2015 | Chan et al. |
| 2016/0212189 A1 | 7/2016 | Zhang |
| 2016/0323606 A1 | 11/2016 | Mao et al. |
| 2018/0084020 A1 | 3/2018 | Li et al. |
| 2018/0324501 A1 | 11/2018 | Kim et al. |
| 2020/0128255 A1 | 4/2020 | Halepovic et al. |

\* cited by examiner

INTRASEGMENT ADJUSTMENT OF VIDEO TRANSMISSION RATE

TECHNICAL FIELD

The present disclosure generally relates to intrasegment adjustment of video transmission rate.

BACKGROUND

Some devices are capable of receiving video content at various transmission rates. After a device starts receiving video content at a particular transmission rate, there may be a degradation in a network being used to transmit the video content. The degradation may require a change in the transmission rate.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

OVERVIEW

Various implementations disclosed herein include devices, systems, and methods for adjusting a transmission rate of a video stream while a segment is being transmitted. In some implementations, a method includes determining a first transmission rate for transmitting an entirety of a segment of a video stream to a client device. The segment includes a set of frames. In some implementations, the method includes, after transmitting a first subset of the set of frames at the first transmission rate, detecting that a network connectivity of the client device has reduced below a connectivity threshold associated with the first transmission rate. In some implementations, the method includes transmitting an entirety of the segment at a second transmission rate that is less than the first transmission rate. In some implementations, the method includes triggering the client device to present a second subset of the set of frames that corresponds to a temporal position in the video stream after the first subset of the set of frames while foregoing re-presentation of the first subset of the set of frames.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

EXAMPLE EMBODIMENTS

A video stream that is being transmitted to a client device includes various segments. Each segment includes numerous frames. While the video stream is being transmitted, a transmission rate of the video stream can be changed. However, the change goes into effect after a current segment finishes to play at the client device. If the transmission rate deteriorates significantly while the current segment is being played at the client device, the client device may drop packets corresponding to a remainder of the current segment or not receive the packets fast enough thereby leading to a loss of video at the client device and a detracted user experience.

The present disclosure provides methods, systems and/or devices for changing a transmission rate of a video stream while a current segment is being transmitted and using the new transmission rate to present a remainder of the current segment at the client device. Since the new transmission rate is applied to the current segment, frames in the current segment are not dropped due to a network degradation. By contrast, if the new transmission rate is not applied to the current segment, some frames in the current segment may be dropped if the network degrades.

In operation, an edge device adjusts a transmission rate of a video stream being transmitted to a client device. The edge device detects that network conditions have deteriorated while frames of a higher bitrate version of a segment are being transmitted to the client device. Since the edge device cannot change the transmission rate for transmitting the remainder of the frames in the higher bitrate version of the segment, the edge device transmits a lower bitrate version of the entire segment at a lower transmission rate. Since the client device has already presented a first part of the higher bitrate version of the segment, the edge device instructs the client device to decode a corresponding first part of the lower bitrate version of the segment at a faster decode rate (e.g., at a second decoder) and to skip presentation of the first part of the lower bitrate version of the segment. Since the client device did not receive a second part of the higher bitrate version of the segment, the client device has not presented the second part of the higher bitrate version of the segment. As such, the edge device instructs the client device to start presenting a corresponding second part of the lower bitrate version of the segment.

Figure 1A:
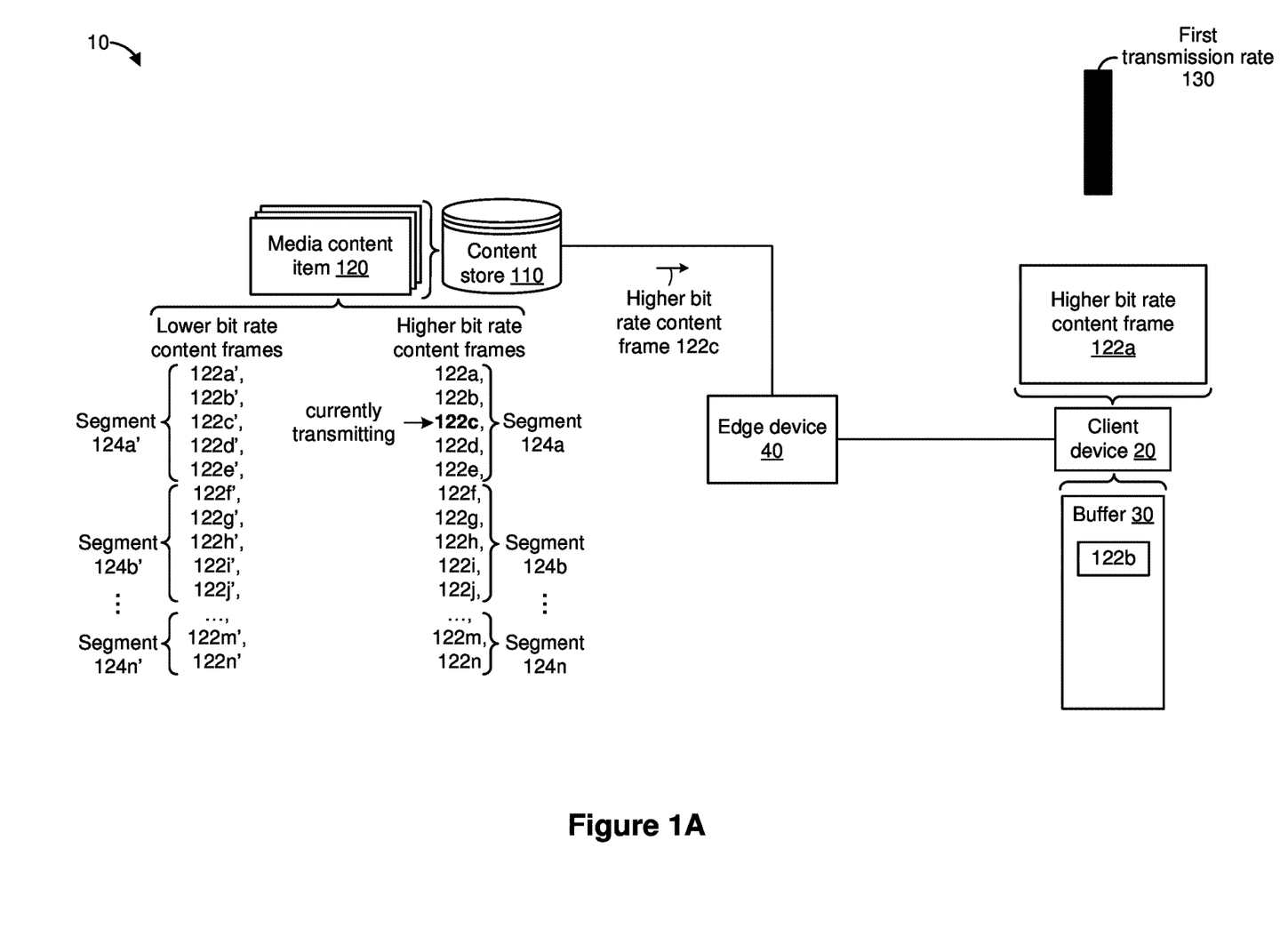
FIGS. 1A-1F are diagrams of an example operating environment in accordance with some implementations.

FIG. 1A is a diagram that illustrates an example operating environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 10 includes a client device 20, an edge device 40, and a content store 110. In some implementations, the edge device 40 is a part of an edge computing network (not shown). Although the content store 110 is shown as being separate from the edge device 40, in some implementations, the content store 110 is integrated into the edge device 40. In some implementations, the content store 110 includes a distributed storage system. In some implementations, the client device 20 is coupled with a display. For example, in some implementations, the client device 20 includes a dongle that is connected to a television. Alternatively, in some implementations, the client device 20 is integrated into a display (e.g., a television). As shown in FIG. 1A, the client device 20 includes a buffer 30.

The content store 110 stores a set of one or more media content items 120. Each media content item 120 includes a set of content frames. The content store 110 can store different versions of a media content item 120. For example, the content store 110 can store a high bit rate version of the media content item 120 and a low bit rate version of the media content item 120. In the example of FIG. 1A, the content store 110 stores higher bit rate content frames 122a, 122b, . . . , and 122n, and lower bit rate content frames 122a', 122b', . . . , and 122n' for the same media content item 120. The edge device 40 retrieves the higher bit rate content frames 122a, 122b, . . . , and 122n from the content store 110 when the edge device 40 is transmitting the media content item 120 to the client device 20 at a first transmission rate 130. By contrast, the edge device 40 retrieves the lower bit rate content frames 122a', 122b', . . . , and 122n' from the content store 110 when the edge device 40 is transmitting the media content item 120 to the client device 20 at a transmission rate that is lower than the first transmission rate 130.

As shown in FIG. 1A, a group of content frames can form a segment. FIG. 1A illustrates a first higher bit rate segment 124a, a second higher bit rate segment 124b, . . . , and an nth higher bit rate segment 124n. FIG. 1A also illustrates a first lower bit rate segment 124a', a second lower bit rate segment 124b', . . . , and an nth lower bit rate segment 124n'. In the example of FIG. 1A, the client device 20 is currently presenting the first higher bit rate segment 124a. Specifically, the client device 20 is presenting a first higher bit rate content frame 122a on a display. The buffer 30 is storing a second higher bit rate content frame 122b that will be presented after the first higher bit rate content frame 122a. A third higher bit rate content frame 122c is being transmitted to the client device 20 at the first transmission rate 130.

Figure 1B:
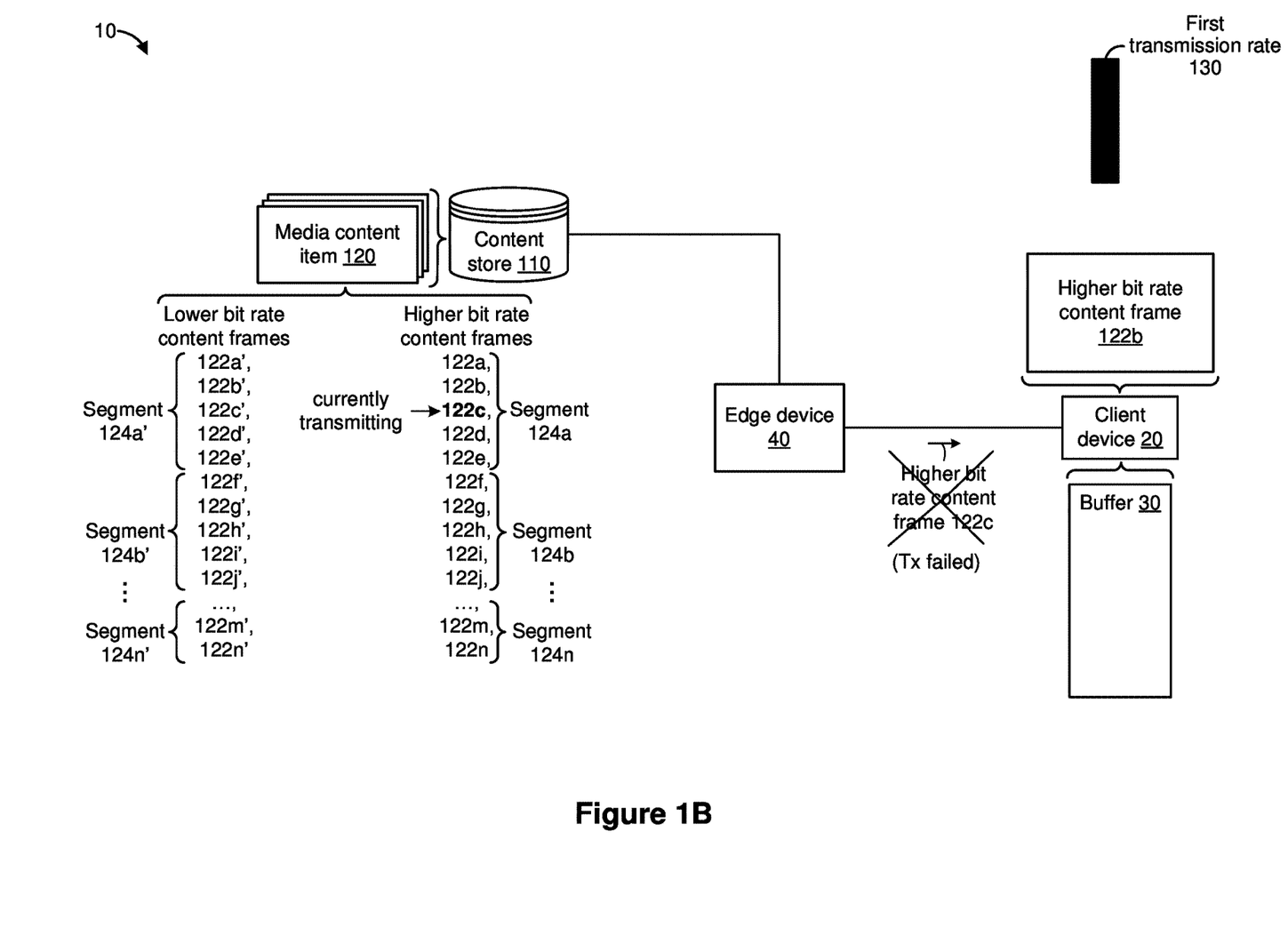

Referring to FIG. 1B, the transmission of the third higher bit rate content frame 122c fails or is delayed, for example, because a connection between the edge device 40 and the client device 20 degrades. The transmission of the third higher bit rate content frame 122c may have failed because a bandwidth of the client device 20 may have dropped to a value that does not support the first transmission rate 130.

The transmission of the third higher bit rate content frame 122c may have failed because of network congestion (e.g., too many other client devices may be requesting content from the edge device 40). As shown in FIG. 1B, the client device 20 is now presenting the second higher bit rate content frame 122b that was stored in the buffer 30. However, the buffer 30 does not store the third higher bit rate content frame 122c because its transmission failed. In some examples, the buffer 30 may store a set of frames that are to be presented next in a sequential manner, and the edge device 40 may detect that a subsequent frame that is not stored in the buffer 30 may not reach the client device 20 in time due to network degradation. For example, the buffer 30 may store the next ten frames and the edge device 40 may detect that an eleventh frame may not reach the client device 20 in time due to network degradation.

Figure 1C:
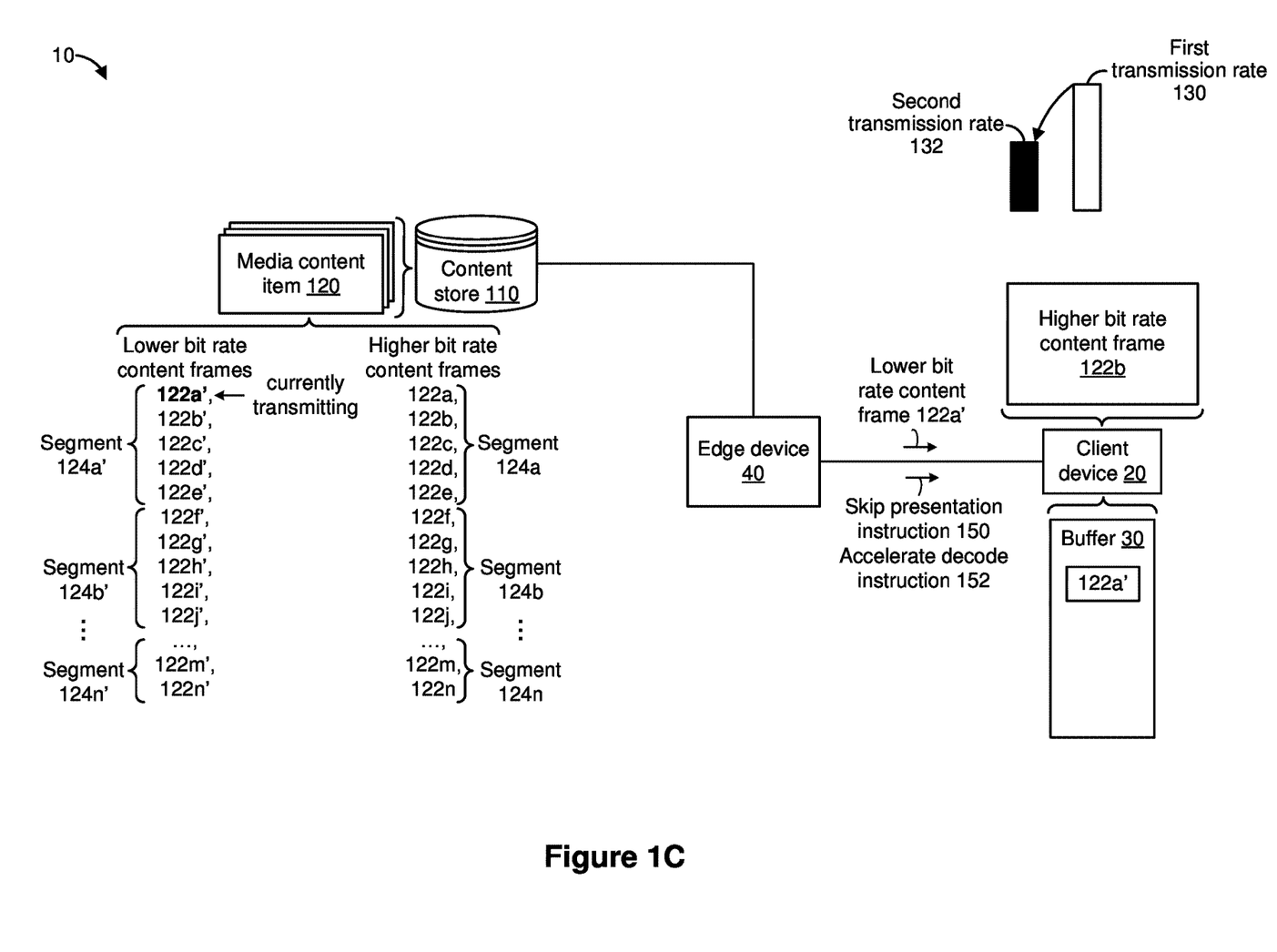

Referring to FIG. 1C, if the network degradation persists, then re-transmitting the third higher bit rate content frame 122c at the first transmission rate 130 will likely fail. Hence, instead of re-transmitting the third higher bit rate content frame 122c at the first transmission rate 130, the edge device 40 transmits a lower bit rate version of the first higher bit rate segment 124a at a lower transmission rate. As shown in FIG. 1C, the edge device 40 transmits the first lower bit rate segment 124a' at the second transmission rate 132 that is lower than the first transmission rate 130. Specifically, FIG. 1C shows the first lower bit rate content frame 122a' being transmitted to the client device 20 and being stored in the buffer 30. Since the first higher bit rate content frame 122a has already been presented at the client device 20, the edge device 40 sends a skip presentation instruction 150 to the client device 20 that instructs the client device 20 to skip presentation of the first lower bit rate content frame 122a'. In some implementations, the client device 20 skips presentation of the first lower bit rate content frame 122a' in response to determining that the client device 20 has already presented the corresponding higher bit rate content frame 122a. The edge device 40 also sends an accelerate decode instruction 152 to the client device 20 instructing the client device 20 to decode the first lower bit rate content frame 122a' at an accelerated decoding rate (e.g., at a multiple of a default decoding rate, for example, at 1.25× the default decoding rate, at 5× the default decoding rate, at 10× the default decoding rate, at 35× the default decoding rate, etc.). In some implementations, the client device 20 determines to decode the first lower bit rate content frame 122a' at the accelerated decoding rate. The client device 20 can apply the accelerated decoding rate and skip presentation of the first lower bit rate content frame 122a' based on a timestamp associated with the first lower bit rate content frame 122a'. For example, the client device 20 may maintain a pointer that points to a timestamp of a current playback position, and the client device 20 can skip presentation of the first lower bit rate content frame 122a' if its corresponding timestamp is smaller than the timestamp of the current playback position.

Figure 1D:
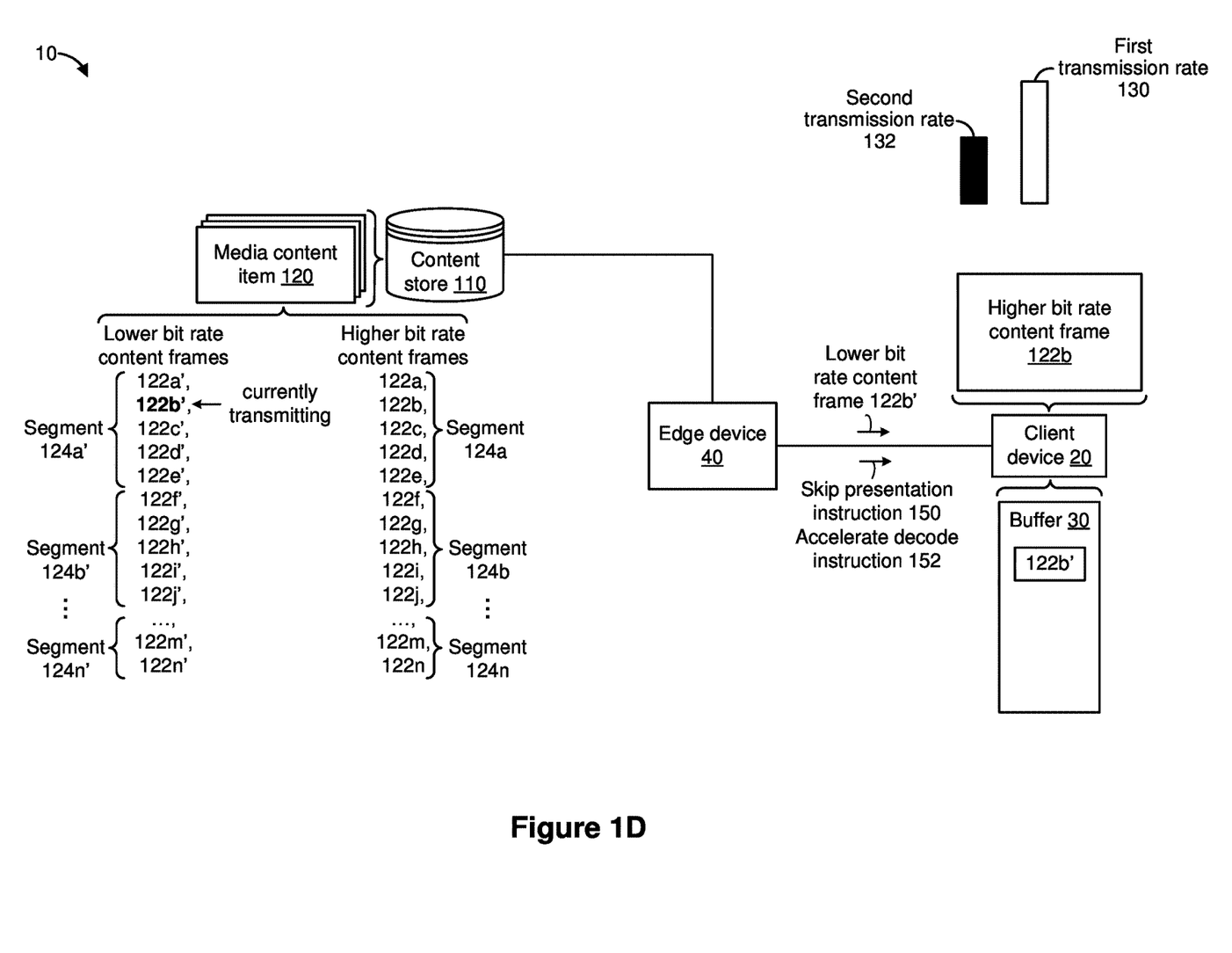

In operation, the client device 20 receives the first lower bit rate content frame 122a', and the client device 20 decodes the first lower bit rate content frame 122a' at an accelerated decoding rate. However, the client device 20 does not present the first lower bit rate content frame 122a' because the client device 20 has already presented the first higher bit rate content frame 122a. Referring to FIG. 1D, the edge device 40 transmits the second lower bit rate content frame 122b' at the second transmission rate 132. As shown in FIG. 1D, the edge device 40 can include the skip presentation instruction 150 and the accelerate decode instruction 152 with the second lower bit rate content frame 122b'. The client device 20 receives the second lower bit rate content frame 122b', and the client device 20 decodes the second lower bit rate content frame 122b' at the accelerated decoding rate. However, the client device 20 does not present the second lower bit rate content frame 122b' because the client device 20 has already presented the second higher bit rate content frame 122b.

Figure 1E:
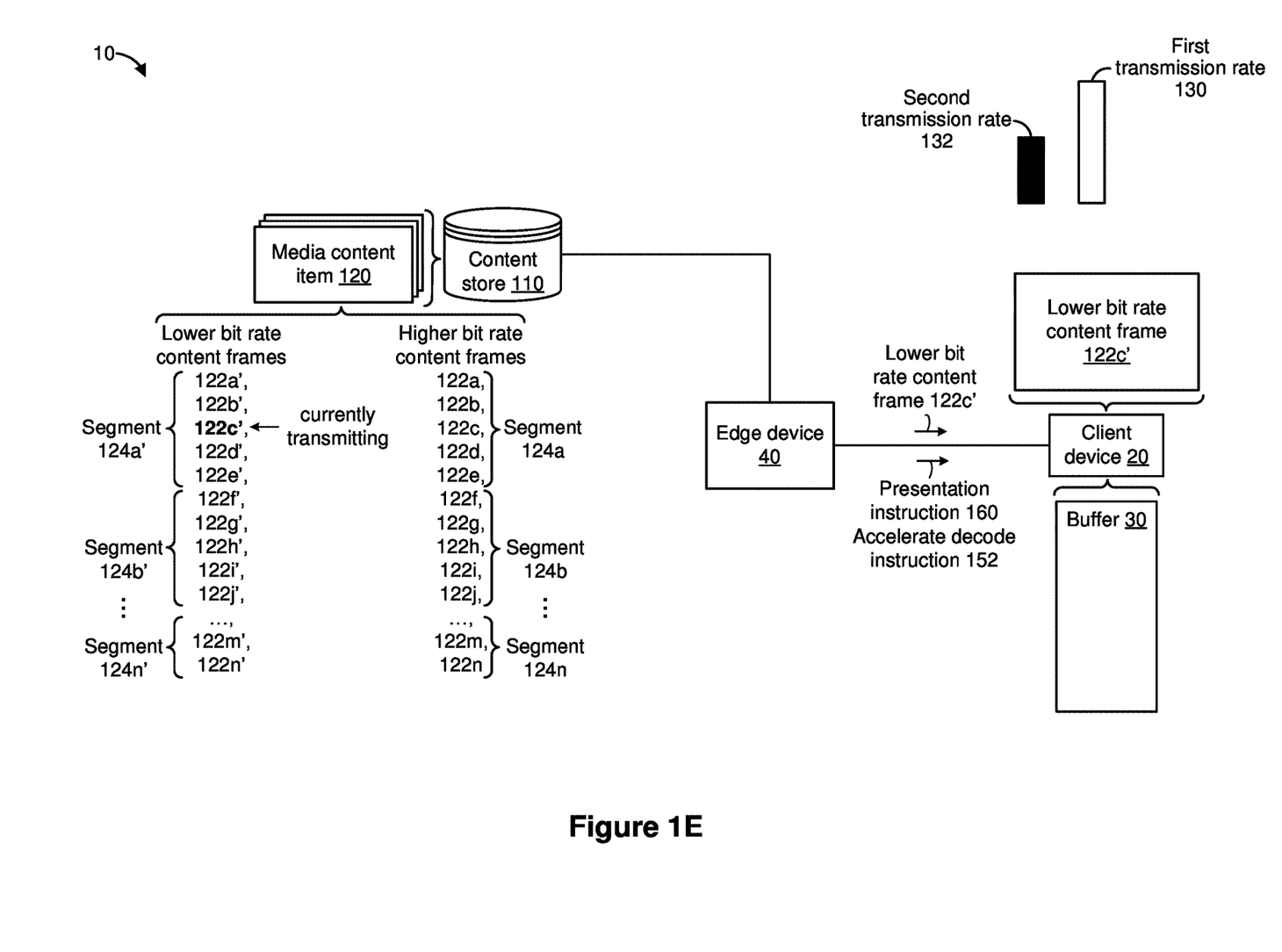

Referring to FIG. 1E, the edge device 40 transmits the third lower bit rate content frame 122c' at the second transmission rate 132. Since the third higher bit rate content frame 122c was not presented at the client device 20, the edge device 40 sends a presentation instruction 160 that instructs the client device 20 to present the third lower bit rate content frame 122c'. The edge device 40 may also send the accelerate decode instruction 152 instructing the client device 20 to decode the third lower bit rate content frame 122c' at the accelerated decoding rate. As shown in FIG. 1E, the client device 20 decodes the third lower bit rate content frame 122c' and presents the third lower bit rate content frame 122c'. In some implementations, the client device 20 determines to present the third lower bit rate content frame 122c' based on a timestamp associated with the third lower bit rate content frame 122c'. For example, the client device 20 can present the third lower bit rate content frame 122c' if its corresponding timestamp matches the timestamp of the current playback position.

Transmitting a lower bit rate version of the first higher bit rate segment 124a allows the edge device 40 to lower the transmission rate while the first higher bit rate segment 124a is being presented at the client device 20. Lowering the transmission rate while the client device 20 is presenting the first higher bit rate segment 124a provides an appearance that the client device 20 successfully presented the first higher bit rate segment 124a. Since the user of the client device 20 probably cannot differentiate between the first higher bit rate segment 124a and the first lower bit rate segment 124a', starting with the first higher bit rate segment 124a and finishing with the first lower bit rate segment 124a' provides a perception that the client device 20 successfully received and presented the first higher bit rate segment 124a. In other words, starting with the first higher bit rate segment 124a and finishing with the first lower bit rate segment 124a' ensures that there is no interruption in the presentation of the media content item 120 at the client device 20 due to network degradation.

Figure 1F:
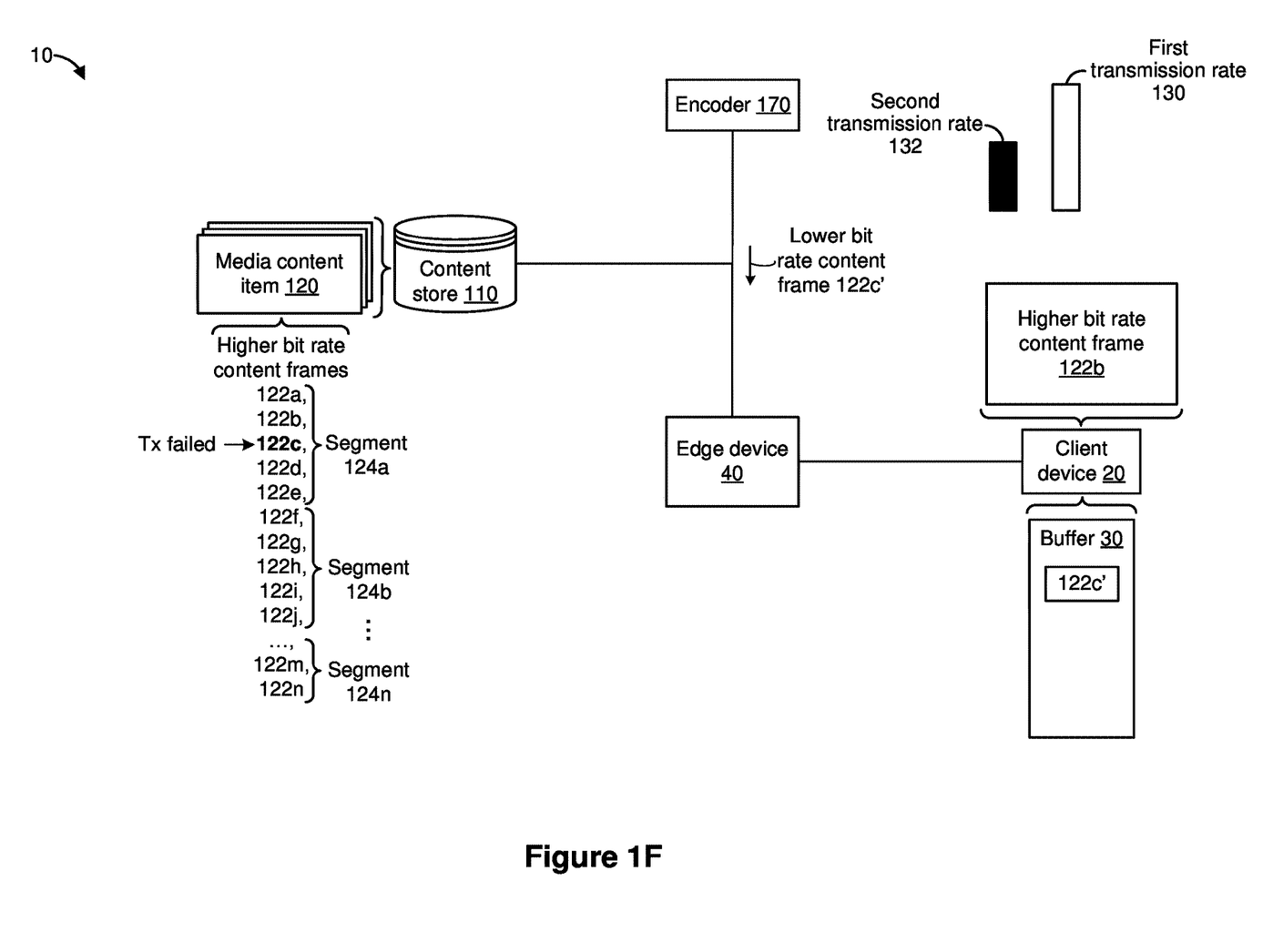

FIG. 1F illustrates an alternative to the implementation illustrated in FIGS. 1C-1E. Referring to FIG. 1F, in some implementations, an encoder 170 generates a lower bit rate version of a content frame based on a higher bit rate version of a reference frame (e.g., an I-frame). In the example of FIG. 1F, the encoder 170 can generate the third lower bit rate content frame 122c' based on the first higher bit rate content frame 122a. The edge device 40 transmits the third lower bit rate content frame 122c' that gets stored in the buffer 30 and is presented by the client device 20 after the second higher bit rate content frame 122b. In this implementation, the content store 110 may not have to store lower bit rate content frames because the encoder 170 can generate the lower bit rate content frames based on a higher bit rate content frame. Hence, the content store 110 uses less memory. Furthermore, the edge device 40 does not have to send lower bit rate versions of content frames that have already been presented. For example, the edge device 40 does not have to send the first lower bit rate content frame 122a' and the second lower bit rate content frame 122b' (shown in FIGS. 1C and 1D). Not having to send the lower bit rate versions of content frames that have already been presented reduces congestion on a network that may already be congested. In this implementation, the client device 20 does not have to decode lower bit rate versions of content frames that the client device 20 has already presented.

Figure 2:
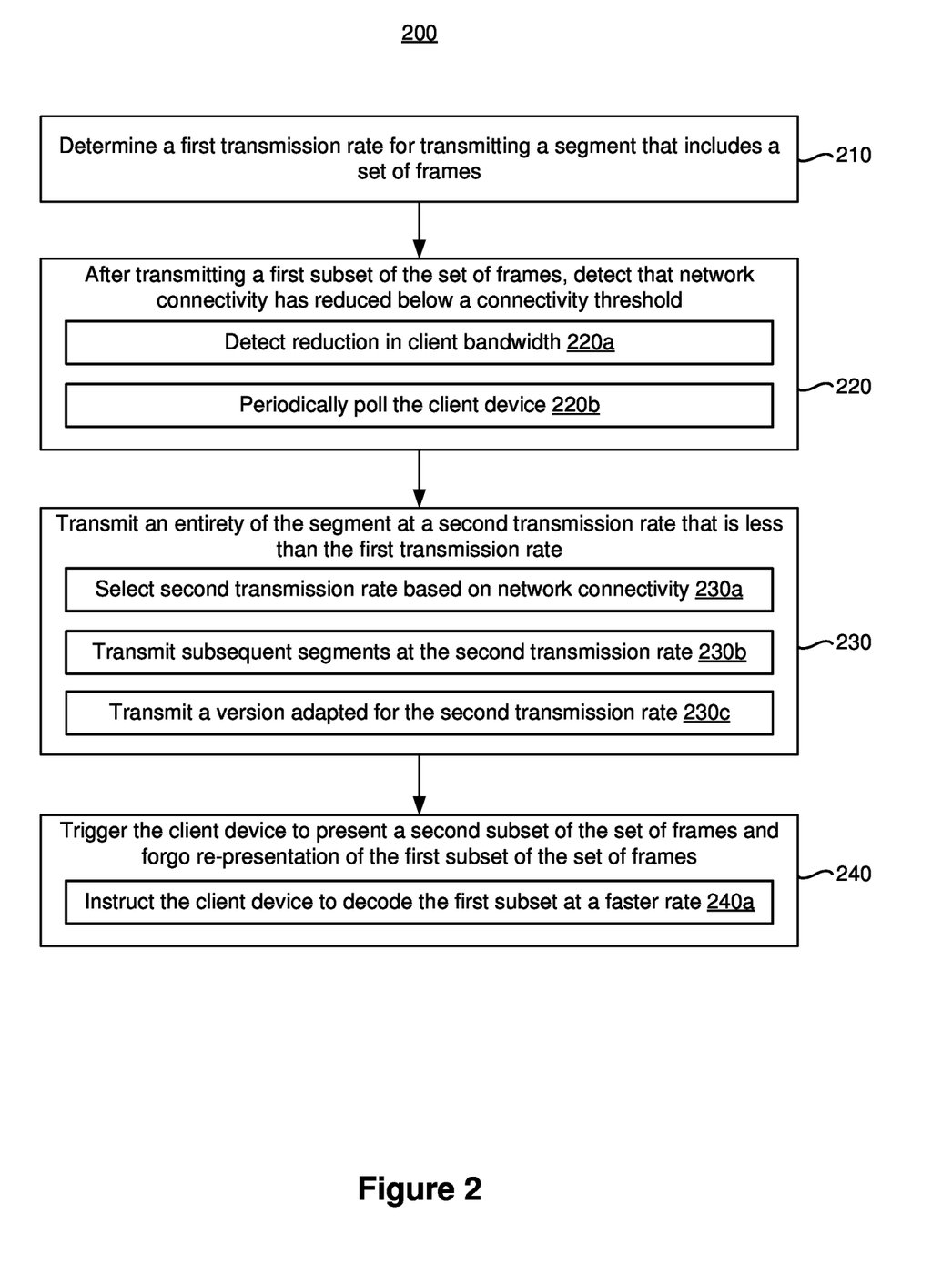
FIG. 2 is a flowchart representation of a method of changing a transmission rate of a video stream in accordance with some implementations.

FIG. 2 is a flowchart representation of a method 200 for changing a transmission rate of a video stream. In various implementations, the method 200 is performed by a device (e.g., by the edge device 40 shown in FIGS. 1A-1F). In some implementations, the method 200 is performed by processing logic, including hardware, firmware, software, or a combination thereof. In some implementations, the method 200 is performed by a processor executing code stored in a non-transitory computer-readable medium (e.g., a memory).

As represented by block 210, in various implementations, the method 200 includes determining a first transmission rate for transmitting an entirety of a segment of a video stream to a client device. For example, as shown in FIG. 1A, the edge device 40 is transmitting the third higher bit rate content frame 122c at the first transmission rate 130. The segment includes a set of frames. For example, as shown in FIG. 1A, the first higher bit rate segment 124a includes the higher bit rate content frames 122a, 122b, 122c, 122d and 122e. The first transmission rate can be selected based on network status data that indicates a status of the network. For example, the first transmission rate can be selected based on a congestion level of the network. The first transmission rate can also be selected based on a bandwidth of the client device 20. For example, the higher the bandwidth, the greater the first transmission rate.

As represented by block 220, in some implementations, the method 200 includes after transmitting a first subset of the set of frames at the first transmission rate, detecting that a network connectivity of the client device has reduced below a connectivity threshold associated with the first transmission rate. For example, as described in relation to FIG. 1B, a communication channel between the edge device 40 and the client device 20 may degrade due to network congestion and/or due to a sudden decrease in the bandwidth of the client device 20.

As represented by block 220a, in some implementations, detecting that the network connectivity has reduced includes detecting that an amount of bandwidth available to the client device has reduced to a value less than a threshold amount of bandwidth to support the first transmission rate. For example, the first transmission rate may require a certain amount of client bandwidth, and the client bandwidth may have dropped to a value that is less than the required bandwidth. As such, sending frames at the first transmission rate may result in the frames being dropped and not being received by the client device.

As represented by block 220b, in some implementations, the method 200 includes periodically polling the client device for status data that indicates the network connectivity of the client device. For example, the edge device 40 periodically obtains a report from the client device 20. The report can indicate network status data that the client device 20 is collecting. For example, the report can indicate a current bandwidth of the client device 20. The edge device 40 can also generate the status data on its own. For example, the edge device 40 can monitor a communication channel between the edge device 40 and the client device 20 to determine a health (e.g., bandwidth, congestion, etc.) of the communication channel. In some implementations, the status data indicates a number of frames that the client device 20 successfully received. The status data can indicate a timestamp of the last frame that the client device 20 successfully received.

As represented by block 230, in various implementations, the method 200 includes transmitting an entirety of the segment at a second transmission rate that is less than the first transmission rate. For example, as shown in FIG. 1C, the edge device 40 starts transmitting the first lower bit rate segment 124a' from the beginning at the second transmission rate 132. As represented by block 230a, in some implementations, the method 200 includes selecting the second transmission rate based on the network connectivity of the client device. For example, the second transmission rate can be proportional to the client bandwidth. As another example, the second transmission rate can be inversely proportional to the network congestion level.

As represented by block 230b, in some implementations, the method 200 includes transmitting subsequent segments of the video stream at the second transmission rate until the network connectivity satisfies the connectivity threshold associated with the first transmission rate. For example, referring to FIG. 1E, the edge device 40 can send the second lower bit rate segment 124b' at the second transmission rate 132 instead of sending the second higher bit rate segment 124b at the first transmission rate 130 if the network conditions do not improve. In some implementations, the method 200 includes switching from the second transmission rate to the first transmission rate when the network connectivity satisfies the connectivity threshold associated with the first transmission rate. For example, if the network conditions improve, the edge device 40 can send the second higher bit rate segment 124b at the first transmission rate 130 instead of sending the second lower bit rate segment 124b' at the second transmission rate 132.

As represented by block 230c, in some implementations, the video stream is associated with a first version that is adapted for the first transmission rate and a second version that is adapted for the second transmission rate. For example, as shown in FIGS. 1A-1E, the media content item 120 includes higher bit rate content frames and lower bit rate content frames. In some implementations, transmitting the first subset at the first transmission rate includes transmitting the first version that is adapted for the first transmission rate. For example, as described in relation to FIGS. 1A and 1B, the edge device 40 successfully sent the first higher bit rate content frame 122a and the second higher bit rate content frame 122b to the client device 20. In some implementations, transmitting the entirety of the segment at the second transmission rate includes transmitting the second version that is adapted for the second transmission rate. For example, as described in relation to FIGS. 1C-1D, the edge device 40 transmits the first lower bit rate segment 124a' at the second transmission rate 132 when sending the first higher bit rate segment 124a at the first transmission rate 130 is not feasible.

In some implementations, transmitting the entirety of the segment at the second transmission rate includes generating a lower bit rate version of the second subset of the set of frames based on a higher bit rate version of a reference frame. In some implementations, the method 200 includes transmitting the lower bit rate version of the second subset of the set of frames while foregoing transmission of a lower bit rate version of the first subset of the set of frames. For example, as shown in FIG. 1F, the edge device 40 transmits the lower bit rate content frame 122c' to the client device 20 without transmitting the lower bit rate content frames 122a' and 122b' shown in FIG. 1E. In some implementations, the method 200 includes transmitting lower bit rate versions of a reference frame and the second subset of the set of frames while foregoing transmission of a lower bit rate version of the first subset of the set of frames.

As represented by block 240, in some implementations, the method 200 includes triggering the client device to present a second subset of the set of frames that corresponds to a temporal position in the video stream after the first subset of the set of frames while foregoing re-presentation of the first subset of the set of frames. For example, as shown in FIGS. 1C-1E, the edge device 40 instructs the client device 20 to skip presentation of the first lower bit rate content frame 122a' and the second lower bit rate content frame 122b' because the client device 20 has already presented the first higher bit rate content frame 122a and the second higher bit rate content frame 122b.

As represented by block 240a, in some implementations, triggering the client device to present the second subset of the set of frames includes instructing the client device to decode the first subset of the set of frames at an accelerated decode rate that is greater than a default decode rate, and forgo re-presentation of the first subset of the set of frames. For example, as shown in FIG. 1C, the edge device 40 sends the accelerate decode instruction 152 to the client device 20 instructing the client device 20 to decode the first lower bit rate content frame 122a' at an accelerated decoding rate. Moreover, as shown in FIG. 1C, the edge device 20 sends the skip presentation instruction 150 to the client device 20 instructing the client device 20 to skip presentation of the first lower bit rate content frame 122a' because the client device 20 has already presented the first higher bit rate content frame 122a.

In some implementations, transmitting the entirety of the segment at the second transmission rate includes including, in each frame of the first subset, an instruction to decode the frame at the accelerated decode rate and to forgo re-presentation of the frame. For example, as shown in FIG. 1C, the edge device 40 sends the skip presentation instruction 150 and the accelerate decode instruction 152 to the client device 20. The skip presentation instruction 150 and the accelerate decode instruction 152 can be integrated into the first lower bit rate content frame 122a' (e.g., into the metadata of the first lower bit rate content frame 122a').

In some implementations, the accelerated decode rate is a multiple of the default decode rate. In some implementations, the edge device 40 specifies the accelerated decoding rate. Referring to FIG. 1C, the accelerate decode instruction 152 can specify the accelerated decoding rate. Alternatively, the client device 20 can determine the accelerated decode rate. For example, the client device 20 can decode the frames as fast as possible.

In some implementations, triggering the client device to present the second subset includes instructing the client device to decode frames in the second subset at the default decoding rate. For example, referring to FIG. 1E, the edge device 40 can instruct the client device 20 to decode the fourth lower bit rate content frame 122d' at the default decoding rate instead of the accelerated decoding rate.

Figure 3:
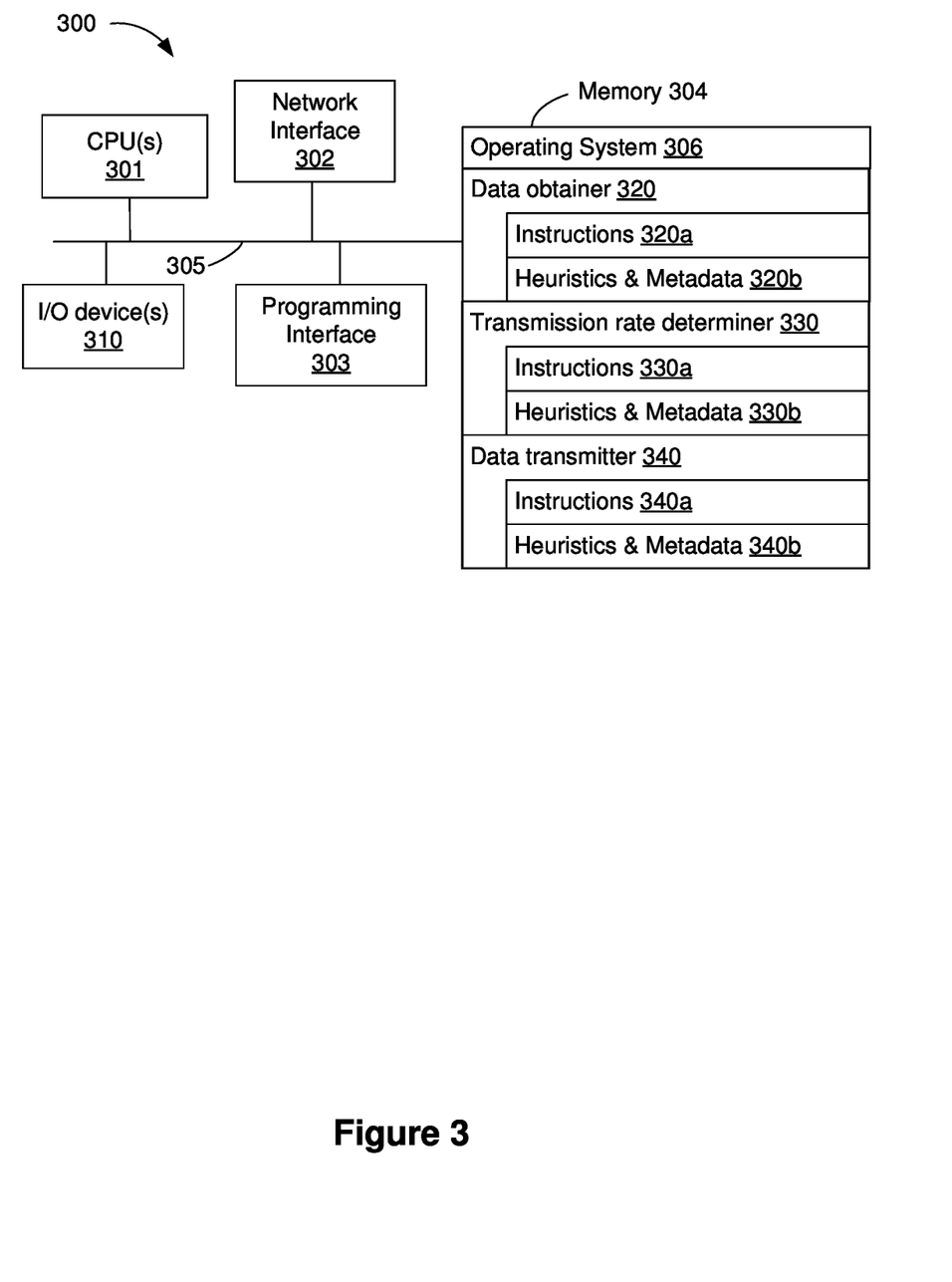
FIG. 3 is a block diagram of a device that changes a transmission rate of a video stream in accordance with some implementations.

FIG. 3 is a block diagram of a device 300 in accordance with some implementations. In some implementations, the device 300 implements the edge device 40 shown in FIGS. 1A-1F. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 300 includes one or more processing units (CPUs) 301, a network interface 302, a programming interface 303, a memory 304, one or more input/output (I/O) devices 310, and one or more communication buses 305 for interconnecting these and various other components.

In some implementations, the network interface 302 is provided to, among other uses, establish and maintain a metadata tunnel between a cloud hosted network management system and at least one private network including one or more compliant devices. In some implementations, the one or more communication buses 305 include circuitry that interconnects and controls communications between system components. The memory 304 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 304 optionally includes one or more storage devices remotely located from the one or more CPUs 301. The memory 304 comprises a non-transitory computer readable storage medium.

In some implementations, the memory 304 or the non-transitory computer readable storage medium of the memory 304 stores the following programs, modules and data structures, or a subset thereof including an optional operating system 306, a data obtainer 320, a transmission rate determiner 330 and a data transmitter 340. In various implementations, the device 300 performs the method 200 shown in FIG. 2.

In some implementations, the data obtainer 320 includes instructions 320a, and heuristics and metadata 320b for obtaining network status data. For example, the data obtainer 320 can periodically poll the client device for a bandwidth value. The data obtainer 320 can analyze a communication channel between the device 300 and the client device to generate the network status data. In some implementations, the data obtainer 320 performs at least some of the operation(s) represented by block 220 in FIG. 2.

In some implementations, the transmission rate determiner 330 includes instructions 330a, and heuristics and metadata 330b for determining a transmission rate for transmitting content frames to the client device. The transmission rate determiner 330 can determine the transmission rate based on the network status data (e.g., the client bandwidth) obtained by the data obtainer 320. For example, the transmission rate determiner 330 can reduce the transmission rate when the client bandwidth reduces and/or when the network congestion increases. As another example, the transmission rate determiner 330 can increase the transmission rate when the client bandwidth increases and/or when the network congestion decreases. In some implementations, the transmission rate determiner 330 performs at least some of the operation(s) represented by blocks 210 and 230 in FIG. 2.

In some implementations, the data transmitter 340 transmits content frames to the client device at the transmission rate determined by the transmission rate determiner 330. In some implementations, the data transmitter 340 selects different versions of the video content based on the transmission rate determined by the transmission rate determiner 330. For example, the data transmitter 340 sends a lower bit rate version of the video content when the transmission rate determiner 330 reduces the transmission rate. In some implementations, the data transmitter 340 performs at least some of the operation(s) represented by block 240 in FIG. 2.

In some implementations, the one or more 110 devices 310 include a receiver for receiving network status data and a transmitter for transmitting content frame data.

It will be appreciated that FIG. 3 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 3 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:

at an edge device including a non-transitory memory and one or more processors:
 determining a first transmission rate for transmitting an entirety of a first segment of a video stream to a client device, wherein the first segment includes a set of frames;
 after transmitting a first subset of the set of frames at the first transmission rate, detecting that a network connectivity of the client device has reduced below a connectivity threshold associated with the first transmission rate; and
 in response to the network connectivity reducing below the connectivity threshold associated with the first transmission rate:
  forgoing transmission of a remainder of the set of frames in the first segment at the first transmission rate;
  transmitting an entirety of the first segment at a second transmission rate that is less than the first transmission rate, wherein transmitting the entirety of the first segment at the second transmission rate includes re-transmitting the first subset of the set of frames that was transmitted at the first transmission rate; and
  triggering the client device to present a second subset of the set of frames that corresponds to a temporal position in the video stream after the first subset of the set of frames while foregoing re-presentation of the first subset of the set of frames.

2. The method of claim 1, wherein detecting that the network connectivity has reduced comprises detecting that an amount of bandwidth available to the client device has reduced to a value less than a threshold amount of bandwidth to support the first transmission rate.

3. The method of claim 1, wherein triggering the client device to present the second subset of the set of frames comprises instructing the client device to:
   decode the first subset of the set of frames at an accelerated decode rate that is greater than a default decode rate; and
   forgo re-presentation of the first subset of the set of frames.

4. The method of claim 3, wherein transmitting the entirety of the first segment at the second transmission rate comprises including, in each frame of the first subset, an instruction to decode the frame at the accelerated decode rate and to forgo re-presentation of the frame.

5. The method of claim 3, wherein the accelerated decode rate is a multiple of the default decode rate.

6. The method of claim 3, wherein triggering the client device to present the second subset comprises instructing the client device to decode frames in the second subset at the default decode rate.

7. The method of claim 1, further comprising:
   transmitting subsequent segments of the video stream at the second transmission rate until the network connectivity satisfies the connectivity threshold associated with the first transmission rate; and
   switching from the second transmission rate to the first transmission rate when the network connectivity satisfies the connectivity threshold associated with the first transmission rate.

8. The method of claim 1, further comprising periodically polling the client device for status data that indicates the network connectivity of the client device.

9. The method of claim 1, further comprising selecting the second transmission rate based on the network connectivity of the client device.

10. The method of claim 1, wherein the video stream is associated with a first version that is adapted for the first transmission rate and a second version that is adapted for the second transmission rate;
   wherein transmitting the first subset at the first transmission rate includes transmitting the first version that is adapted for the first transmission rate; and
   wherein transmitting the entirety of the segment at the second transmission rate includes transmitting the second version that is adapted for the second transmission rate.

11. The method of claim 1, wherein transmitting the entirety of the first segment at the second transmission rate comprises:
   generating a lower bit rate version of the second subset of the set of frames based on a reference frame; and
   transmitting the lower bit rate version of the second subset of the set of frames while forgoing transmission of a lower bit rate version of the first subset of the set of frames.

12. A device comprising:
   one or more processors;
   a non-transitory memory; and
   one or more programs stored in the non-transitory memory, which, when executed by the one or more processors, cause the device to:
      determine a first transmission rate for transmitting an entirety of a first segment of a video stream to a client device, wherein the first segment includes a set of frames;
      after transmitting a first subset of the set of frames at the first transmission rate, detect that a network connectivity of the client device has reduced below a connectivity threshold associated with the first transmission rate; and
      in response to the network connectivity reducing below the connectivity threshold associated with the first transmission rate:
         forgo transmission of a remainder of the set of frames in the first segment at the first transmission rate;
         transmit an entirety of the first segment at a second transmission rate that is less than the first transmission rate, wherein transmitting the entirety of the first segment at the second transmission rate includes re-transmitting the first subset of the set of frames that was transmitted at the first transmission rate; and
         trigger the client device to present a second subset of the set of frames that corresponds to a temporal position in the video stream after the first subset of the set of frames while foregoing re-presentation of the first subset of the set of frames.

13. The device of claim 12, wherein detecting that the network connectivity has reduced comprises detecting that an amount of bandwidth available to the client device has reduced to a value less than a threshold amount of bandwidth to support the first transmission rate.

14. The device of claim 12, wherein triggering the client device to present the second subset of the set of frames comprises instructing the client device to:
   decode the first subset of the set of frames at an accelerated decode rate that is greater than a default decode rate; and
   forgo re-presentation of the first subset of the set of frames.

15. The device of claim 14, wherein transmitting the entirety of the first segment at the second transmission rate comprises including, in each frame of the first subset, an instruction to decode the frame at the accelerated decode rate and to forgo re-presentation of the frame.

16. The device of claim 14, wherein the accelerated decode rate is a multiple of the default decode rate.

17. The device of claim 14, wherein triggering the client device to present the second subset comprises instructing the client device to decode frames in the second subset at the default decode rate.

18. The device of claim 12, wherein the one or more programs further cause the device to:
   transmit subsequent segments of the video stream at the second transmission rate until the network connectivity satisfies the connectivity threshold associated with the first transmission rate; and
   switch from the second transmission rate to the first transmission rate when the network connectivity satisfies the connectivity threshold associated with the first transmission rate.

19. The device of claim 11, wherein the one or more programs further cause the device to select the second transmission rate based on the network connectivity of the client device.

20. A non-transitory memory storing one or more programs, which, when executed by one or more processors of a device, cause the device to:
- determine a first transmission rate for transmitting an entirety of a first segment of a video stream to a client device, wherein the first segment includes a set of frames;
- after transmitting a first subset of the set of frames at the first transmission rate, detect that a network connectivity of the client device has reduced below a connectivity threshold associated with the first transmission rate; and
- in response to the network connectivity reducing below the connectivity threshold associated with the first transmission rate:
  - forgo transmission of a remainder of the set of frames in the first segment at the first transmission rate;
  - transmit an entirety of the first segment at a second transmission rate that is less than the first transmission rate, wherein transmitting the entirety of the first segment at the second transmission rate includes re-transmitting the first subset of the set of frames that was transmitted at the first transmission rate; and
  - trigger the client device to present a second subset of the set of frames that corresponds to a temporal position in the video stream after the first subset of the set of frames while foregoing re-presentation of the first subset of the set of frames.

* * * * *